United States Patent
Hagino et al.

(10) Patent No.: US 12,549,692 B2
(45) Date of Patent: Feb. 10, 2026

(54) NOTIFICATION METHOD AND NOTIFICATION SYSTEM

(71) Applicant: Panasonic Intellectual Property Management Co., Ltd., Osaka (JP)

(72) Inventors: Kazune Hagino, Osaka (JP); Kazuaki Sakata, Osaka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 106 days.

(21) Appl. No.: 18/644,854

(22) Filed: Apr. 24, 2024

(65) Prior Publication Data
US 2024/0275929 A1    Aug. 15, 2024

Related U.S. Application Data

(63) Continuation of application No. PCT/JP2022/037364, filed on Oct. 6, 2022.

(30) Foreign Application Priority Data

Oct. 28, 2021    (JP) .................................. 2021-176927

(51) Int. Cl.
| | |
|---|---|
| *H04N 9/31* | (2006.01) |
| *G06T 7/70* | (2017.01) |
| *H04N 17/02* | (2006.01) |

(52) U.S. Cl.
CPC ............ *H04N 9/3147* (2013.01); *G06T 7/70* (2017.01); *H04N 9/317* (2013.01);
(Continued)

(58) Field of Classification Search
CPC ........ H04N 5/74; H04N 9/3147; H04N 9/317; H04N 9/3185; H04N 9/3194; H04N 17/02; G06T 7/70; G06T 2207/10016
See application file for complete search history.

(56) References Cited

U.S. PATENT DOCUMENTS

| | | | |
|---|---|---|---|
| 7,671,916 B2 * | 3/2010 | Hashimoto | ............ H04N 7/181 348/333.01 |
| 2016/0295184 A1 | 10/2016 | Ishikawa et al. | |

(Continued)

FOREIGN PATENT DOCUMENTS

| | | |
|---|---|---|
| JP | 10-135100 | 5/1998 |
| JP | 2006-304100 | 11/2006 |

(Continued)

OTHER PUBLICATIONS

International Search Report issued Dec. 20, 2022 in International (PCT) Application No. PCT/JP2022/037364.

*Primary Examiner* — Twyler L Haskins
*Assistant Examiner* — John H Morehead, III
(74) *Attorney, Agent, or Firm* — Wenderoth, Lind & Ponack, L.L.P.

(57) ABSTRACT

A notification method includes: acquiring a first image captured at a first timing, the first image including a display area of a video displayed by a projection-type display device; acquiring a second image captured at a second timing, the second image including the display area; comparing first analysis data based on the first image with second analysis data based on the second image; determining, on the basis of a comparison result, whether or not a first deviation has occurred, the first deviation being a deviation of a display parameter related to display, and whether or not a second deviation has occurred, the second deviation being a deviation of a photographing parameter related to photographing; and notifying a user of deviation information indicating a deviation determined to have occurred among the first deviation and the second deviation.

16 Claims, 12 Drawing Sheets

(52) U.S. Cl.
CPC . *H04N 9/3185* (2013.01); *G06T 2207/10016* (2013.01); *H04N 17/02* (2013.01)

(56) References Cited

U.S. PATENT DOCUMENTS

| | | |
|---|---|---|
| 2016/0353068 A1 | 12/2016 | Ishikawa et al. |
| 2018/0359466 A1 | 12/2018 | Sugiura |
| 2019/0004923 A1* | 1/2019 | Ariga ................. G06F 11/3495 |

FOREIGN PATENT DOCUMENTS

| | | | | |
|---|---|---|---|---|
| JP | 2016057108 A | * | 4/2016 | ............... G06T 7/80 |
| JP | 2016-192710 | | 11/2016 | |
| JP | 2016-224172 | | 12/2016 | |
| JP | 2018-207373 | | 12/2018 | |
| JP | 2018207373 A | * | 12/2018 | ............. H04N 17/04 |

* cited by examiner

NOTIFICATION METHOD AND NOTIFICATION SYSTEM

TECHNICAL FIELD

The present disclosure relates to a notification method for a projection-type display system.

BACKGROUND ART

PTL 1 discloses a method for specifying a positional deviation of a video displayed by a display device by using an image obtained by photographing the video displayed by the display device with a camera installed by recalibration processing of a video projection device. In addition, Patent Literature 1 discloses notifying a user of occurrence of positional deviation. As a result, it is possible to prompt the user to execute maintenance for correcting the positional deviation.

CITATION LIST

Patent Literature

PTL 1: Unexamined Japanese Patent Publication No. 2018-207373

SUMMARY OF THE INVENTION

By the way, when a positional deviation of a camera that captures an image for detecting a positional deviation of a video occurs, the positional deviation of the video cannot be correctly detected. Therefore, it is necessary to detect the positional deviation of the camera. In this case as well, it is conceivable to issue a notification to prompt the user to maintain the camera.

The present disclosure provides a notification system capable of notifying which one of a camera and a display device needs to be maintained.

A notification method according to one aspect of the present disclosure includes: a first acquisition step of acquiring a first image captured by a camera at a first timing, the first image including a display area of a video displayed by a display device; a second acquisition step of acquiring a second image captured by the camera at a second timing after a predetermined period from the first timing, the second image including the display area; a comparison step of comparing first analysis data based on the first image with second analysis data based on the second image; a first determination step of determining, based on a comparison result in the comparison step, whether or not a first deviation has occurred, the first deviation being a deviation of a display parameter related to display by the display device, and whether or not a second deviation has occurred, the second deviation being a deviation of a photographing parameter related to photographing by the camera; and a notification step of notifying a user of deviation information indicating a deviation determined to have occurred in the first determination step among the first deviation and the second deviation.

Furthermore, a notification system according to one aspect of the present disclosure includes a display device, a camera, and an information processing device. The information processing device executes a notification method including: a first acquisition step of acquiring a first image captured by a camera at a first timing, the first image including a display area of a video displayed by a display device; a second acquisition step of acquiring a second image captured by the camera at a second timing after a predetermined period from the first timing, the second image including the display area; a comparison step of comparing first analysis data based on the first image with second analysis data based on the second image; a first determination step of determining, on a basis of a comparison result in the comparison step, whether or not a first deviation has occurred, the first deviation being a deviation of a display parameter related to display by the display device, and whether or not a second deviation has occurred, the second deviation being a deviation of a photographing parameter related to photographing by the camera; and a notification step of notifying a user of deviation information indicating a deviation determined to have occurred in the first determination step among the first deviation and the second deviation.

Note that these general or specific aspects may be implemented by a device, a system, a method, an integrated circuit, a computer program, or a computer-readable recording medium such as a CD-ROM, or may be implemented by any combination of the device, the system, the method, the integrated circuit, the computer program, and the recording medium.

The notification method according to one aspect of the present disclosure can notify which one of the camera and the display device needs to be maintained.

DESCRIPTION OF EMBODIMENT

Figure 1:
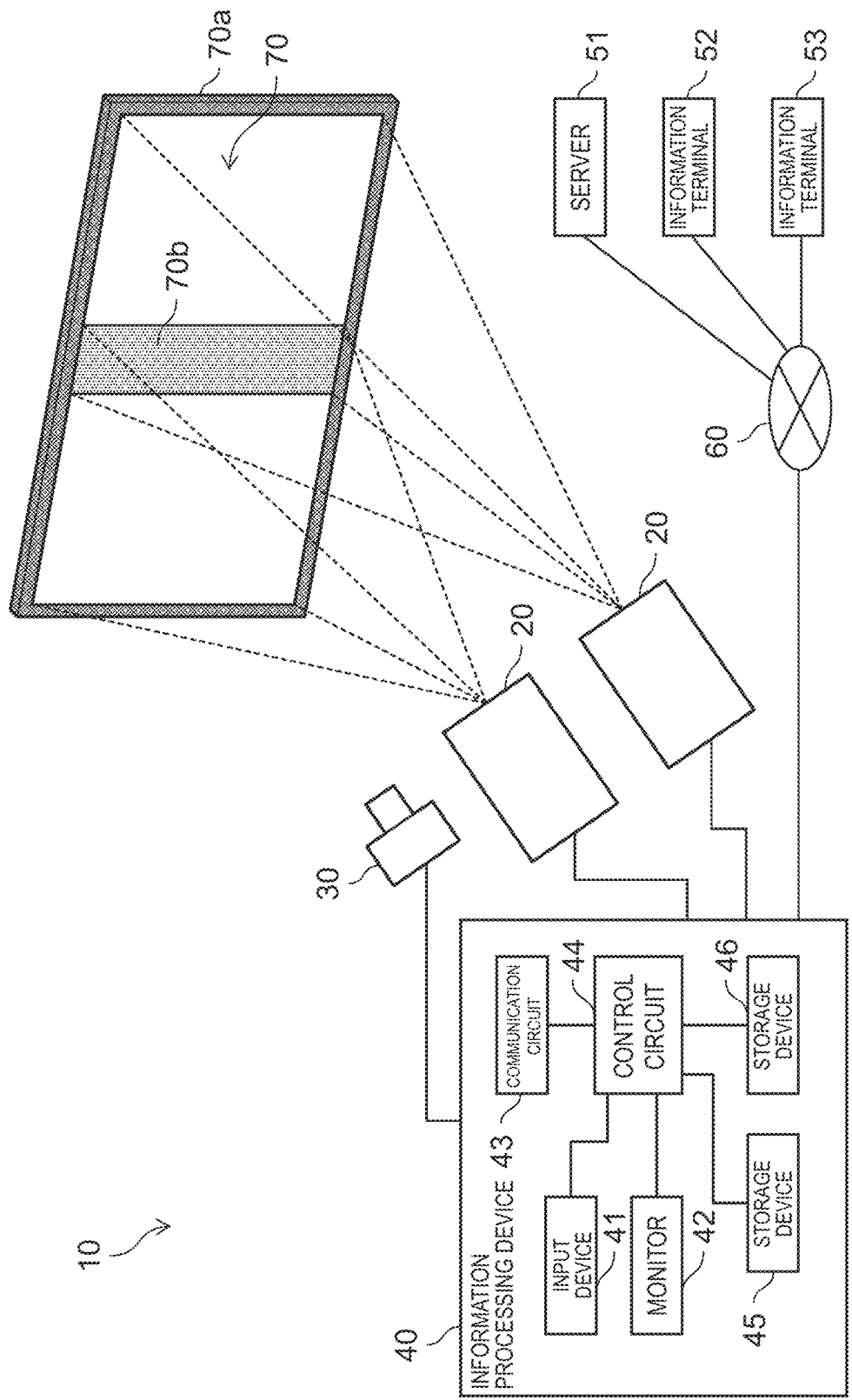
FIG. 1 is a view illustrating a configuration of a projection-type display system according to an exemplary embodiment.

A notification method according to one aspect of the present disclosure includes: a first acquisition step of acquiring a first image captured by a camera at a first timing, the first image including a display area of a video displayed by a display device; a second acquisition step of acquiring a second image captured by the camera at a second timing after a predetermined period from the first timing, the second image including the display area; a comparison step of comparing first analysis data based on the first image with second analysis data based on the second image; a first determination step of determining, on a basis of a comparison result in the comparison step, whether or not a first deviation has occurred, the first deviation being a deviation of a display parameter related to display by the display device, and whether or not a second deviation has occurred, the second deviation being a deviation of a photographing parameter related to photographing by the camera; and a notification step of notifying a user of deviation information indicating a deviation determined to have occurred in the first determination step among the first deviation and the second deviation.

According to this, since the deviation information notified to the user includes the deviation generated among the first deviation and the second deviation, it is possible to notify the user of the device having the parameter that is the source of the included deviation and the deviation. Therefore, it is possible to notify which one of the camera and the display device needs to be maintained.

The method may further include a change step of receiving adjustment of the display parameter in the display device and changing the display parameter according to the received adjustment.

The change of the display parameter may be changed by an adjustment value of a predetermined adjustment range, the notification method may further include a second determination step of determining whether or not the adjustment value has exceeded a predetermined adjustment value, and in the notification step, when the adjustment value has exceeded the predetermined adjustment value in the second determination step, the user may be further notified that an adjustment limit is approaching.

Therefore, it is possible to notify the user that the adjustment limit is approaching. Therefore, it is possible to notify the user that the time at which maintenance is required is approaching.

The display device may be a projector that projects a video onto the display area, and the display parameter may include a position of the video projected by the display device with respect to the display area.

Therefore, it is possible to notify the user that the adjustment limit of the projection position of the video is approaching. Therefore, it is possible to notify the user that the time at which maintenance is required is approaching.

The display device may be a projector that projects a video onto the display area, and the display parameter may include a focus state of the video projected by the display device.

Therefore, it is possible to notify the user that the limit of focus adjustment of the video is approaching. Therefore, it is possible to notify the user that the time at which maintenance is required is approaching.

The display parameter may include a color of a video displayed by the display device.

Therefore, it is possible to notify the user that the limit of the color adjustment of the video is approaching. Therefore, it is possible to notify the user that the time at which maintenance is required is approaching.

Further, the display parameter may include luminance of a video displayed by the display device.

Therefore, it is possible to notify the user that the limit of the luminance adjustment of the video is approaching. Therefore, it is possible to notify the user that the time at which maintenance is required is approaching.

Furthermore, the notification method may be executed by a controller connected to the camera and the display device via a local network, and the notification method may further include an accumulation step of accumulating the deviation information notified in the notification step and at least one of the first image, the second image, the first analysis data, the second analysis data, and the comparison result in different storages.

Therefore, the deviation information can be managed separately from at least one of the first image, the second image, and the comparison result. For example, the security levels of both can be managed separately. Furthermore, for example, the data can be divided depending on whether or not the data is data to be communicated.

In the accumulation step, (i) the deviation information may be accumulated in a first storage device connected to the camera and the display device via an external network, and (ii) at least one of the first image, the second image, and the comparison result may be accumulated in a second storage device connected to the camera and the display device via a local network.

Therefore, it is possible to reduce a communication load on the network for transmitting the deviation information.

Furthermore, a notification system according to one aspect of the present disclosure includes a display device, a camera, and an information processing device, in which the information processing device executes a notification method including: a first acquisition step of acquiring a first image including a display area of a video displayed by the display device, the video being captured by the camera at a first timing; a second acquisition step of acquiring a second image including the display area, the second image being captured by the camera at a second timing after a predetermined period from the first timing; a comparison step of comparing first analysis data based on the first image with second analysis data based on the second image; a first determination step of determining, on the basis of a comparison result in the comparison step, whether or not a first deviation has occurred, the first deviation being a deviation of a display parameter related to display by the display device, and whether or not a second deviation has occurred, the second deviation being a deviation of a photographing parameter related to photographing by the camera; and a notification step of notifying a user of deviation information indicating a deviation determined to have occurred in the first determination step among the first deviation and the second deviation.

According to this, since the deviation information notified to the user includes the deviation generated among the first deviation and the second deviation, it is possible to notify the user of the device having the parameter that is the source of the included deviation and the deviation. Therefore, it is possible to notify which one of the camera and the display device needs to be maintained.

Note that these general or specific aspects may be implemented by a device, a system, a method, an integrated circuit, a computer program, or a computer-readable recording medium such as a CD-ROM, or may be implemented by any combination of the device, the system, the method, the integrated circuit, the computer program, and the recording medium.

Hereinafter, exemplary embodiments will be described with reference to the drawings. Note that the exemplary embodiments described below illustrate comprehensive or specific examples. Numerical values, shapes, materials, components, arrangement positions and connection modes of the components, steps, order of the steps, and the like shown in the following exemplary embodiments are merely examples, and are not intended to limit the present disclosure. Further, among the components in the following exemplary embodiments, components not recited in the independent claims are described as arbitrary components.

Each drawing is a schematic diagram, and is not necessarily strictly illustrated. In the drawings, substantially the same components are denoted by the same reference numerals, and redundant description may be omitted or simplified.

EXEMPLARY EMBODIMENT

[Configuration]

First, a configuration of a projection-type display system according to an exemplary embodiment will be described. FIG. 1 is a diagram illustrating a configuration of a projection-type display system according to an exemplary embodiment.

Projection-type display system 10 is a system corresponding to multi-projection that constructs one image by images projected by each of two projection-type display devices 20. Projection-type display system 10 is an example of a notification system. Further, in order to project an image in accordance with screen 70 (along an area inside frame 70a of screen 70), projection-type display system 10 performs calibration processing using an image captured by camera 30. Projection-type display system 10 includes two projection-type display devices 20, camera 30, and information processing device 40. Projection-type display system 10 may further include server 51 and information terminals 52, 53. Note that projection-type display system 10 only needs to include at least one projection-type display device 20, and it is not essential to support multi-projection. Further, projection-type display device 20 may include a plurality of cameras 30.

The projection-type display device 20 projects an image in accordance with screen 70 under the control of information processing device 40. Projection-type display device 20 is realized by, for example, an optical system such as a laser light source, a phosphor wheel, an image display element, and a projection lens. Specifically, the image display element is a digital micromirror device (DMD), a reflective liquid crystal panel (LCOS: Liquid Crystal On Silicon), or the like. Projection-type display device 20 is an example of the display device.

In a case where multi-projection is realized by two projection-type display devices 20, for example, a technique called edge blending is used. Two images projected by two projection-type display devices 20 have an overlapping portion 70b overlapping each other, and in edge blending, the two images are projected so that the brightness of the two images cross-fades in the overlapping portion 70b. As a result, a joint between the two images is suppressed from standing out.

Camera 30 captures an image showing entire screen 70 under the control of information processing device 40. Screen 70 is an example of an area (that is, the display area) onto which an image is projected by projection-type display device 20. Camera 30 is realized by an image sensor, a lens, and the like.

Information processing device 40 performs information processing for realizing the above-described multi-projection. Such information processing includes calibration processing using an image captured by camera 30 for projecting an image in accordance with screen 70. Information processing device 40 is, for example, a general-purpose device such as a personal computer in which an application program for executing the information processing is installed, but may be a dedicated device of projection-type display system 10. Specifically, information processing device 40 includes input device 41, monitor 42, communication circuit 43, control circuit 44, and storage devices 45, 46. As illustrated in FIG. 1, information processing device 40 (an example of a controller) is connected to camera 30 and two projection-type display devices 20 via a local network.

Input device 41 receives a user's operation. Input device 41 is, for example, a keyboard and a mouse, but may be a touch panel or the like.

Monitor 42 displays an image. Monitor 42 is realized by, for example, a display panel such as a liquid crystal panel or an organic electro luminescence (EL) panel. Note that monitor 42 may be a device separate from information processing device 40.

Communication circuit 43 is a communication circuit for information processing device 40 to communicate with two projection-type display devices 20 and camera 30. Communication circuit 43 communicates with, for example, two projection-type display devices 20 and camera 30 through a local communication network. The communication performed by communication circuit 43 is, for example, wired communication, but may be wireless communication. A communication standard used for communication is also not particularly limited.

Control circuit 44 performs the above information processing. Specifically, control circuit 44 is implemented by a processor or a microcomputer. The function of control circuit 44 is implemented by a processor or a microcomputer constituting control circuit 44 executing a computer program stored in storage device 45.

Storage devices 45, 46 are examples of a non-transitory computer-readable storage mediums that store information necessary for the above information processing, such as a computer program executed by control circuit 44. Specifically, storage devices 45, 46 are realized by a semiconductor memory, a hard disk drive (HDD), or the like. Storage devices 45, 46 do not need to be realized by different storages, and may be realized by different storage areas of the same storage. The user who can access storage device 45 may be limited to a specific user (for example, a servicer to be described later), and the user who can access storage device 46 may be limited to users including the specific user and other users. Note that a user who can access storage device 46 does not need to be limited.

Server 51 is connected to information processing device 40 via network 60. Server 51 may be connected to an information processing device (not illustrated) of another projection-type display system via network 60. Server 51 may receive and accumulate various data generated in projection-type display system 10 via network 60, or may receive and accumulate processing results in information processing device 40 via network 60. Note that network 60 may be a general-purpose communication line such as the Internet or a dedicated communication line.

In server 51, the accumulated various data may be stored in a state of being unbrowsable from information terminal 52, and processing results of the various data may be stored in a state of being browsable from information terminal 52. Here, the various data include the first image, the second image, and the like generated by projection-type display system 10. The first image and the second image are images captured by camera 30. The processing result includes first analysis data, second analysis data, deviation information, and the like. The first analysis data, the second analysis data, and the deviation information are data generated by processing in information processing device 40. Note that details of the various data will be described later.

Information terminal 52 is a terminal used by a user of projection-type display system 10. Information terminal 52 is connected to information processing device 40 via network 60. Information terminal 52 may receive an operation by the user and remotely operate information processing device 40. Information terminal 52 may transmit a control signal for remote operation to information processing device 40 and receive a processing result of processing executed in information processing device 40 according to the control signal. Information terminal 52 is, for example, a computer such as a personal computer (PC), a smartphone, or a tablet.

Information terminal 53 is a terminal used by a servicer that provides projection-type display system 10 to a user. Information terminal 53 is connected to information processing device 40 via network 60. Information terminal 53 may receive an operation by a servicer and remotely operate information processing device 40. Information terminal 53 may transmit a control signal for remote operation to information processing device 40 and receive a processing result of processing executed in information processing device 40 according to the control signal, or may cause server 51 to transmit the processing result and cause server 51 to accumulate the processing result.

Further, information terminal 53 may transmit a control signal for remote operation to server 51, and may process various data generated in projection-type display system 10 accumulated in server 51 according to the control signal. Furthermore, information terminal 53 may set processing results of various data in server 51 to a state where the processing results can be browsed from information terminal 52. Information terminal 53 is, for example, a computer such as a personal computer (PC), a smartphone, or a tablet.

[Operation]

Figure 2:
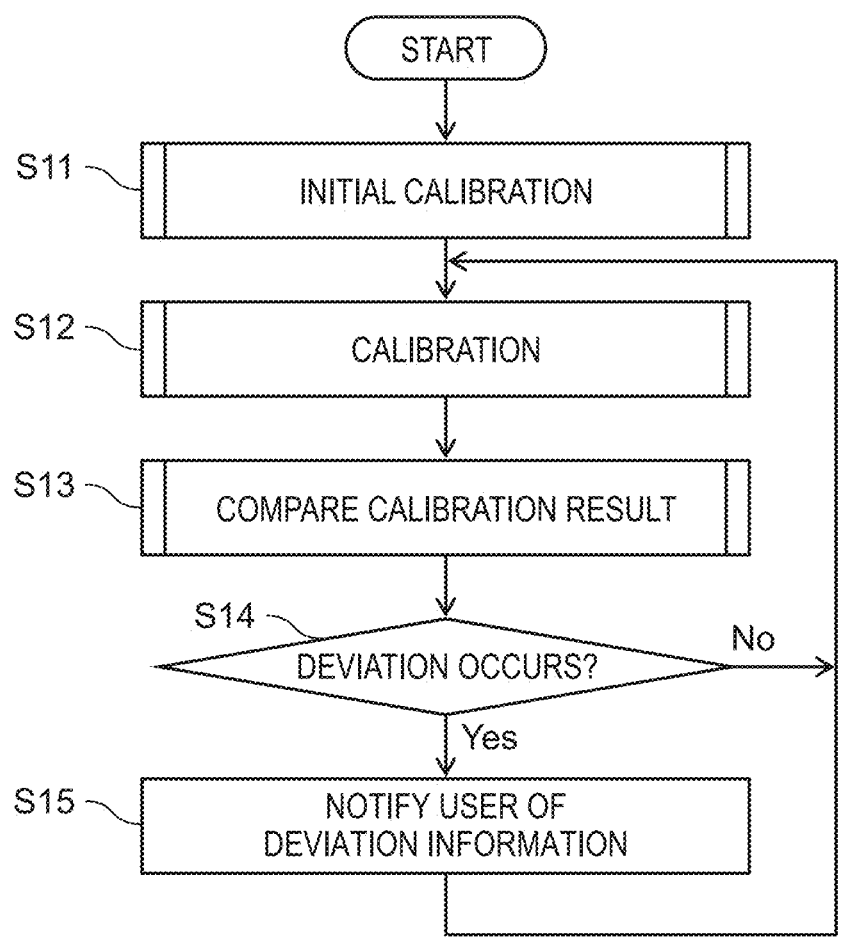
FIG. 2 is a view illustrating an example of a flowchart of an operation of the projection-type display system.

Next, an operation of projection-type display system 10 will be described. FIG. 2 is a diagram illustrating an example of a flowchart of an operation of projection-type display system 10.

First, control circuit 44 executes initial calibration processing (S11). In the initial calibration processing, control circuit 44 acquires the first image from camera 30 and generates first analysis data based on the first image. The first image is an image captured by camera 30 at the first timing, and includes a display area (screen 70 in the present exemplary embodiment) of a video displayed by projection-type display device 20. Details of the initial calibration will be described later with reference to FIG. 3.

Next, control circuit 44 executes calibration processing (S12). In the calibration processing, control circuit 44 acquires the second image from camera 30 and generates second analysis data based on the second image. The second image is an image captured by camera 30 at a second timing that is a predetermined time after the first timing, and is an image including a display area of projection-type display device 20. Details of the calibration processing will be described later with reference to FIG. 5.

Next, control circuit 44 compares the initial calibration result with the calibration result (S13). Control circuit 44 compares the first analysis data with the second analysis data.

Next, control circuit 44 determines whether or not a deviation has occurred (S14). On the basis of the comparison result of step S13, control circuit 44 determines whether or not a first deviation has occurred, the first deviation being a deviation of a display parameter related to display by projection-type display device 20 and whether or not a second deviation has occurred, the second deviation being a deviation of a photographing parameter related to photographing by camera 30.

The display parameters include parameters related to a position of a video projected by projection-type display device 20, a focus state of the video projected, a color of the video projected (displayed), and luminance of the video projected (displayed).

The photographing parameters include the position and attitude of camera 30, the focal length, and the like. The photographing parameter is also referred to as a camera parameter.

Next, control circuit 44 notifies the user of deviation information (S15). Control circuit 44 notifies the user of the deviation information by transmitting the deviation information to information terminal 52 using communication circuit 43, for example. Information terminal 52 that has received the deviation information displays the deviation information (for example, graphs illustrated in FIGS. 8 and 9 to be described later). The deviation information indicates the deviation determined to have occurred in step S14. For example, if it is determined in step S14 that the first deviation has occurred, the deviation information includes the first deviation of the display parameters by projection-type display device 20, and if it is not determined in step S14 that the first deviation has occurred, the deviation information does not include the first deviation. In addition, for example, if it is determined in step S14 that the second deviation has occurred, the deviation information includes the second deviation of the photographing parameters by camera 30, and if it is not determined in step S14 that the second deviation has occurred, the deviation information does not include the second deviation. That is, the deviation information may include only the first deviation, may include only the second deviation, or may include both the first deviation and the second deviation among the first deviation and the second deviation depending on the determination result of step S14.

Note that the first deviation occurs when a deviation (difference) equal to or greater than a first threshold occurs in the display parameters in projection-type display device 20. Furthermore, the second deviation occurs when a deviation (difference) equal to or greater than a second threshold occurs in the photographing parameters in camera 30.

[Initial Calibration Processing]

Figure 3:
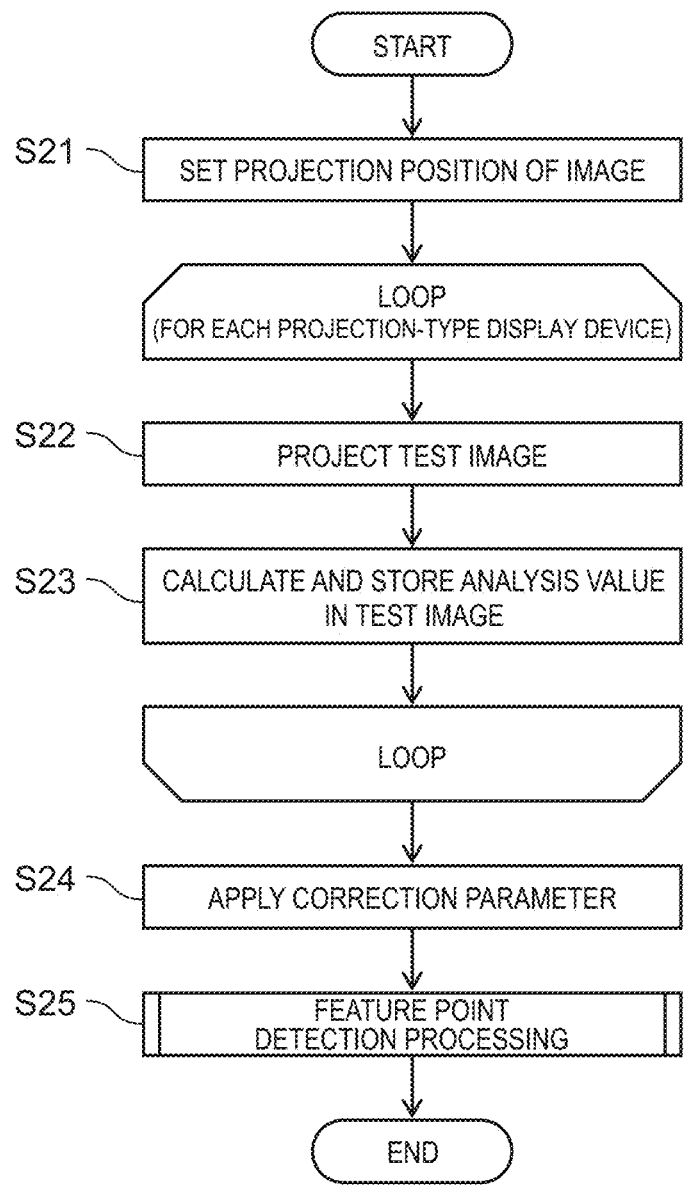
FIG. 3 is a flowchart illustrating an example of initial calibration processing.

Next, details of the initial calibration processing (S11) of projection-type display system 10 will be described. The initial calibration processing is processing performed at the start of operation of projection-type display system 10 or the like. FIG. 3 is a flowchart illustrating an example of initial calibration processing.

First, control circuit 44 sets the projection positions such that the projection positions of the images of two projection-type display devices 20 are aligned with screen 70 (step S21). Specifically, control circuit 44 causes each of two projection-type display devices 20 to project an image by transmitting a control signal to each of two projection-type display devices 20 via communication circuit 43.

At this time, control circuit 44 adjusts the projection direction, the lens shift amount, the zoom magnification, the focal length, and the like of each of two projection-type display devices 20 such that the edges of the projection ranges of the two images projected by two projection-type display devices 20 are along frame 70a of screen 70.

Hereinafter, processing of storing the projection position of a test image of one projection-type display device 20 will be described, but this processing is performed for each of two projection-type display devices 20.

Control circuit 44 transmits a control signal to projection-type display device 20 via communication circuit 43 to cause projection-type display device 20 to project the test image (S22). The test image only needs to be an image suitable for calculating an analysis value in the next step S23, such as an image having a predetermined color pattern. Here, the analysis value indicates an evaluation value of a display parameter of projection-type display device 20. The analysis value includes coordinates of a feature point in the captured image, color information of a specific region in the captured image, and focus information indicating a focus state of the test image in the captured image.

Next, control circuit 44 calculates an analysis value in an image obtained by capturing the test image projected on screen 70, and stores first analysis data indicating the calculated analysis value in storage device 45 (S23). Calculation of the analysis value in step S23 is processing for calculating the evaluation value of the display parameter of projection-type display device 20. Specifically, the coordinates of the feature point as the analysis value are used to specify the projection position of the image. In other words, it is used to specify the relative position between projection-type display device 20 and screen 70. In addition, the color information as the analysis value is used to specify the color of the color pattern projected by projection-type display device 20. The focus information as the analysis value is used to specify the focus state of the test image projected by projection-type display device 20. Since the first analysis data is calculated based on the image captured at the first timing, the first analysis data includes a first display parameter that is a display parameter at the first timing.

Specifically, control circuit 44 transmits a control signal to camera 30 via communication circuit 43 to cause camera 30 to capture an image (still image) including screen 70 on which the test image is projected. Control circuit 44 acquires a captured image (more specifically, image information of the captured image) from camera 30 via communication circuit 43, and detects a plurality of feature points, color information, and a focus state with the acquired image as a processing target. At this time, control circuit 44 uses, for example, an optimized algorithm for detecting a feature point appearing in the test image. Similarly, control circuit 44 uses, for example, an optimized algorithm for detecting the color information of the color pattern of the test image. Similarly, control circuit 44 uses, for example, an optimized algorithm for detecting the focus state of the test image.

For example, in the detection of the feature point, a portion where regions of different colors intersect is detected as the feature point in the test image. Hereinafter, the coordinates of the detected N feature points are collectively expressed as FP(N)={FP1, FP2, FP3, . . . , FPn, . . . , FPN}. 1, 2, 3, . . . N are identification information (ID) of the feature points, and FP1, FP2, FP3, . . . are coordinates of the feature points. The FP(N) is stored in storage device 45.

In the detection of the color information, color information of a region of a specific color in the test image is detected. The detected color information is stored in storage device 45.

In the detection of the focus information, the focus state in the test image is detected. The detected focus information is stored in storage device 45.

In addition, control circuit 44 performs geometric correction on each of the two images projected by two projection-type display devices 20 using the first analysis data stored in step S23 as necessary. Using the first analysis data stored in step S23, control circuit 44 performs the edge blending processing on overlapping portion 70b of the two images projected by two projection-type display devices 20. Control circuit 44 automatically executes a series of processing using the image (more specifically, image information obtained from camera 30 through communication circuit 43) captured by camera 30 (S24).

Immediately after step S24, control circuit 44 performs feature point detection processing (S25). The feature point detection processing here is processing for specifying a relative position between camera 30 and screen 70. Details of the feature point detection processing will be described later.

[First Example of Feature Point Detection Processing]

Figure 4:
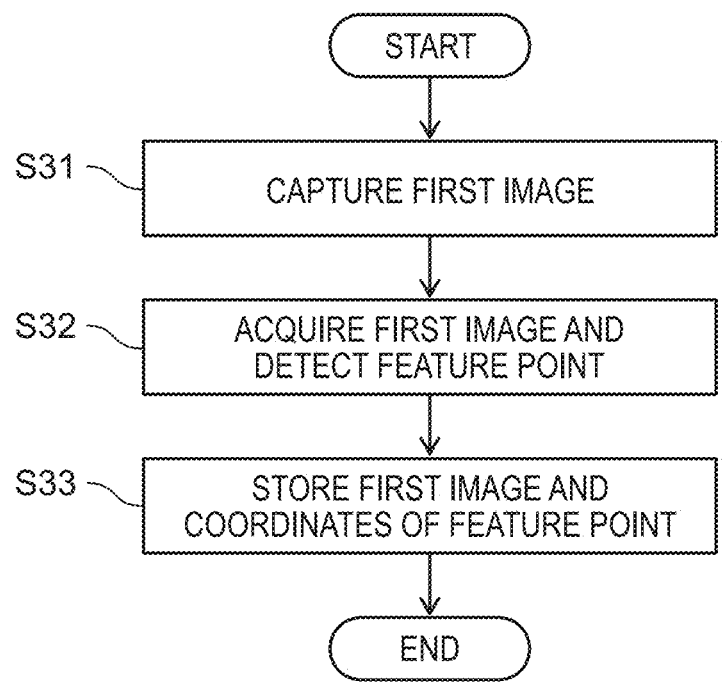
FIG. 4 is a flowchart illustrating an example of feature point detection processing.

Hereinafter, a specific example of the feature point detection processing performed in step S25 will be described. FIG. 4 is a flowchart illustrating an example of the feature point detection processing.

For example, control circuit 44 transmits a control signal to camera 30 via communication circuit 43 when an operation from the user is received in input device 41, thereby causing camera 30 to capture an image (still image) (S31). At this time, image photographing conditions (white balance, shutter speed, ISO sensitivity, F-Number, etc.) instructed from information processing device 40 (control circuit 44) to camera 30 by the control signal may be set to a preset setting value. Hereinafter, the image captured in step S31 is an example of the first image.

When the first image is captured by camera 30, control circuit 44 acquires the first image (more specifically, image information of the first image) from camera 30 via communication circuit 43, and detects a plurality of feature points with the acquired first image as a processing target (S32). At this time, control circuit 44 uses, for example, an algorithm for detecting feature points appearing at four corners of rectangular screen 70. Note that any existing algorithm may be used to detect the feature point, and open source or the like may be appropriately used.

Control circuit 44 stores the first image and the coordinates of each of the plurality of detected feature points in the first image in association with each other in storage device 45 (S33). Note that identification information (ID) of the feature point may be assigned to the coordinates of the feature point. The information stored in step S33 may be included in the first analysis data. Since the information stored in step S33 is calculated based on the first image captured at the first timing, the information includes a first photographing parameter that is the photographing parameter at the first timing.

The first image in step S31 may include the test image projected on projection-type display device 20. That is, the processing in step S32 may be performed on the first image including the test image. In other words, the image to be a target of step S23 and the first image may be different images or the same image.

[Calibration Processing]

Figure 5:
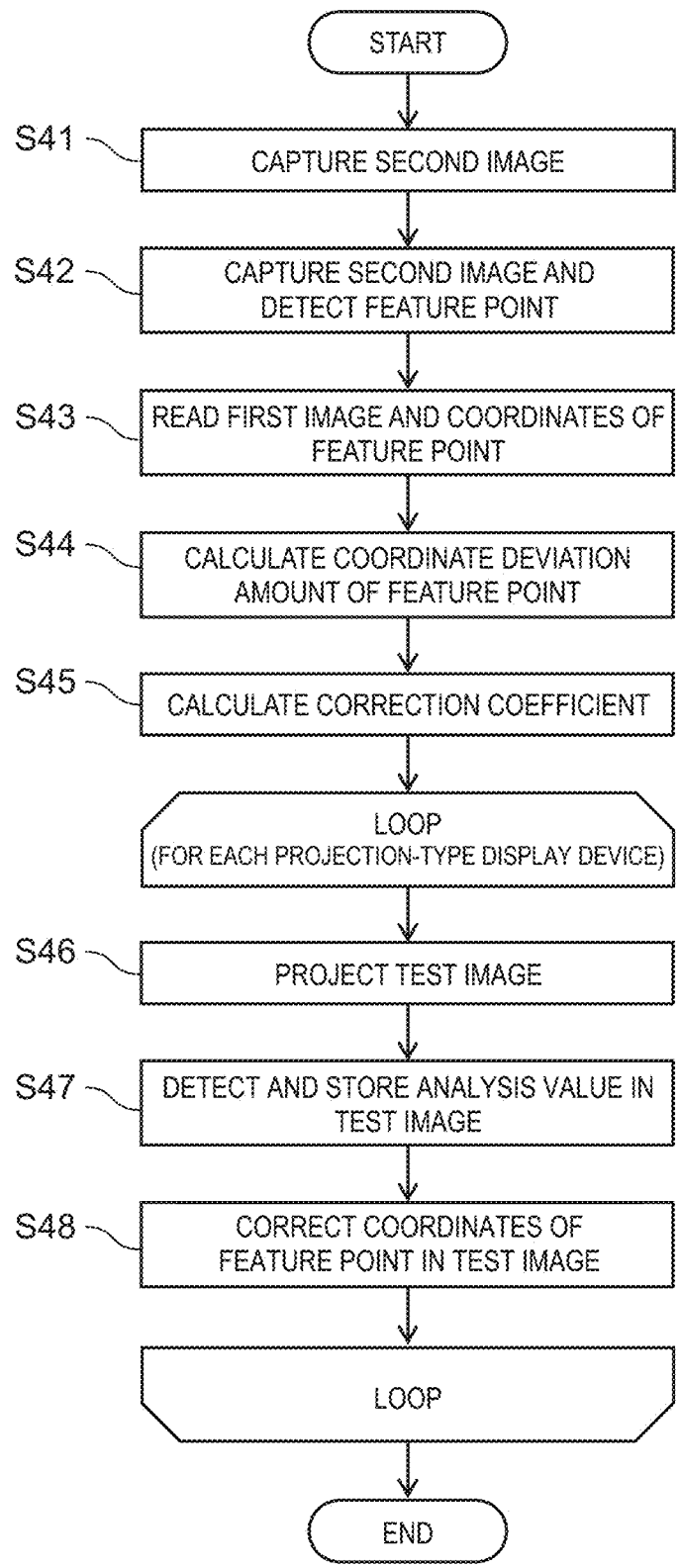
FIG. 5 is a flowchart illustrating an example of calibration processing.

Next, details of the calibration processing (S12) performed after the first timing at which the initial calibration processing (S11) is performed will be described. FIG. 5 is a flowchart illustrating an example of calibration processing.

When a predetermined second timing after the first timing arrives, control circuit 44 transmits a control signal to camera 30 via communication circuit 43 in response to the arrival, thereby causing camera 30 to capture an image (still image) (S41). For example, control circuit 44 stores photographing conditions in storage device 45 at the time of the initial calibration processing, and refers to storage device 45 to cause the camera to capture an image under the same photographing conditions as those at the time of the initial calibration processing. Hereinafter, the image captured in step S41 is an example of the second image.

Note that the second image is automatically captured without depending on the user's operation. For example, control circuit 44 manages schedule information (once every predetermined period of time, such as one day, one week, or one month) of the calibration processing, and periodically captures the second image on the basis of the schedule information. The schedule information is stored (registered) in advance in storage device 45 by the user's operation on input device 41, for example. Note that the photographing schedule may be managed by a higher-level device than information processing device 40 such as a cloud server (not illustrated), and information processing device 40 may capture the second image on the basis of a command from the higher-level device.

Furthermore, the second image may be captured on the basis of a user's operation. For example, the second image may be captured when the user inputs a photographing command of the second image by performing a predetermined operation on input device 41 when the user views the image projected on screen 70 and determines that calibration is necessary.

When the second image is captured by camera 30, control circuit 44 acquires the second image (more specifically, image information of the second image) from camera 30 via communication circuit 43, and detects a plurality of feature points with the acquired second image as a processing target (S42). The method of detecting the plurality of feature points is similar to the method described in step S32 except that the processing target is the second image. The second image and the plurality of feature points detected in step S42 may be included in the second analysis data. The second analysis data may include coordinates of each of the plurality of detected feature points in the second image. Since the second image, the plurality of feature points, and the coordinates of the plurality of feature points are calculated based on the second image captured at the second timing, the coordinates include a second photographing parameter that is a photographing parameter at the second timing.

Next, control circuit 44 reads the first image and the coordinates of the plurality of feature points stored in storage device 45 in step S33 (S43). Then, control circuit 44 calculates a coordinate deviation amount at the current time point (second timing) of each of the plurality of read feature points (S44). Specifically, control circuit 44 specifies a feature amount of each of the plurality of read feature points by collating the coordinates of each of the plurality of feature points with the first image. For each of the plurality of feature points, control circuit 44 determines one feature point having a feature amount most similar to the feature amount of the feature point from among the plurality of feature points detected in step S42, and calculates coordinates of the feature point and coordinates of the determined feature point as the coordinate deviation amount.

Note that the coordinate deviation amount of each of the plurality of feature points indicates a deviation (change) in the relative position between camera 30 and screen 70. That is, in step S44, it can be said that the deviation of the relative position between camera 30 and screen 70 is detected. In other words, the coordinate deviation amount calculated in step S44 is an example of a second deviation amount of the second deviation.

Next, control circuit 44 calculates a correction coefficient of the coordinate system of camera 30 on the basis of the coordinate deviation amount of each of the plurality of feature points (S45). Control circuit 44 calculates, as a correction coefficient, a homography matrix H for converting the coordinate system of camera 30 at the current time point (second timing) into the coordinate system of camera 30 at the time point (first timing) when the initial calibration processing is executed, on the basis of the coordinate deviation amount of each of the plurality of feature points. The homography matrix H is expressed by the following formula.

$$H = \begin{pmatrix} H_{11} & H_{12} & H_{13} \\ H_{21} & H_{22} & H_{23} \\ H_{31} & H_{32} & 1 \end{pmatrix} \qquad \text{[Math 1]}$$

Here, when the coordinates of the second image (image captured at the current time point) are (x, y), the corresponding coordinates (x', y') of the first image (image captured at the time point when the initial calibration processing is executed) are expressed by the following formula.

$$x' = \frac{H_{11}x + H_{12}y + H_{13}}{H_{31}x + H_{32}y + 1} \qquad \text{[Math 2]}$$

$$y' = \frac{H_{21}x + H_{22}y + H_{23}}{H_{31}x + H_{32}y + 1}$$

Note that, since a method of calculating homography matrix H from the deviation amounts of four or more feature points in a biaxial coordinate system is known, a detailed description thereof is omitted here.

Subsequently, control circuit 44 performs correction processing of image projection position for each of two projection-type display devices 20. Hereinafter, processing of correcting the image projection position of one projection-type display device 20 will be described, but this processing is performed for each of the two projection-type display devices 20.

Control circuit 44 transmits a control signal to projection-type display device 20 via communication circuit 43 to cause projection-type display device 20 to project the test image (S46). The test image is the same as the test image projected in step S22 of the initial calibration processing.

Next, control circuit 44 calculates an analysis value in an image obtained by capturing the test image projected on screen 70, and stores second analysis data indicating the calculated analysis value in storage device 45 (S47). This processing is similar to step S23 of the initial calibration processing. Since the second analysis data is calculated based on the image captured at the second timing, the second analysis data includes the second display parameter that is the display parameter at the second timing.

Next, control circuit 44 corrects coordinates FP'(N) of the feature point detected in step S47 on the basis of the correction coefficient (homography matrix H) calculated in step S45 (S48). That is, control circuit 44 corrects the coordinates of the feature point detected in the positional relationship between camera 30 and screen 70 at the current time point to the coordinates obtained when the feature point is detected in the positional relationship between camera 30 and screen 70 when the initial calibration processing is executed. Specifically, control circuit 44 calculates the corrected coordinates FP"(N) by the following formula.

$$FP''(N) = H \times FP'(N) \quad \text{[Math 3]}$$

The second image in step S41 may include the test image projected on projection-type display device 20. That is, the processing in step S42 may be performed on the second image including the test image. In other words, the image being a target of step S47 and the second image may be different images or the same image.

[Comparison Processing]

Figure 6:
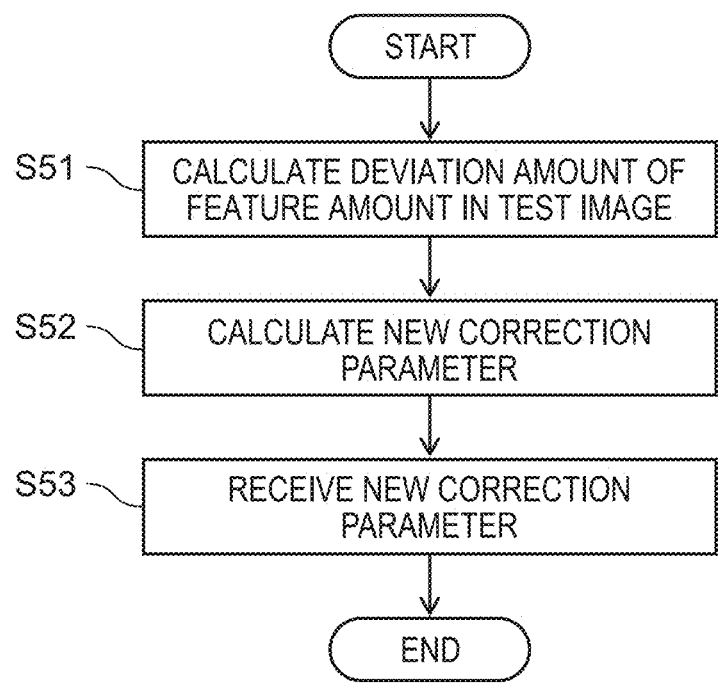
FIG. 6 is a flowchart illustrating an example of comparison processing.

Next, details of the comparison processing (S13) performed after the calibration processing (S12) will be described. FIG. 6 is a flowchart illustrating an example of comparison processing.

Control circuit 44 calculates a deviation amount between the analysis value indicated by the first analysis data stored in step S23 of the initial calibration processing and the analysis value indicated by the second analysis data obtained in step S48 of the calibration processing (S51). For example, the deviation amount is a deviation amount between the coordinates FP(N) of the feature point and the coordinates FP"(N) of the feature point. In the coordinates FP"(N) after the correction, the deviation (change) of the relative position between camera 30 and screen 70 included in the coordinates FP'(N) before the correction is removed. Therefore, the deviation amount between the coordinates FP(N) and the coordinates FP"(N) indicates the deviation (change) of the relative position between projection-type display device 20 and screen 70. That is, in step S51, it can be said that the deviation of the relative position between projection-type display device 20 and screen 70 is detected. In other words, the deviation amount calculated in step S51 is an example of the first deviation amount.

In addition, the first deviation amount may include a deviation amount between the color information stored in the initial calibration and the color information stored in the calibration. Furthermore, the first deviation amount may include a deviation amount between the focus information stored in the initial calibration and the focus information stored in the calibration.

Next, control circuit 44 calculates a new correction parameter on the basis of the second deviation amount calculated in step S51 (S52). Specifically, for each feature point n, control circuit 44 calculates a homography matrix Hn such that coordinates FP"n move to coordinates FPn, and calculates a new geometric correction parameter (homography matrix) Hnewn by multiplying a current geometric correction parameter (homography matrix) Holdn by a homography matrix Hn. That is, the new geometric correction parameter Hnewn is calculated based on the expression of Hnewn=Holdn×Hn.

Further, control circuit 44 may calculate a color correction parameter for adjusting a luminance value of each color of RGB of projection-type display device 20 on the basis of the deviation amount of the color information so that predetermined reference color information is obtained. Further, control circuit 44 may calculate a focus correction parameter for adjusting the focus state of projection-type display device 20 on the basis of the deviation amount of the focus state so that the optimum focus state is obtained.

Then, control circuit 44 receives the new correction parameter calculated in step S52, and sets the same in projection-type display device 20 (S53). Specifically, control circuit 44 transmits a setting command including the new correction parameter to projection-type display device 20 via communication circuit 43. As a result, the correction parameter in projection-type display device 20 is changed. In other words, the image projected by projection-type display device 20 is corrected.

When determining that the first deviation amount calculated in step S51 is smaller than a predetermined value, control circuit 44 may omit the processing of steps S52 and S53. For example, when the coordinates FP"(N) and the coordinates FP(N) substantially coincide with each other and there is no deviation in the relative position between projection-type display device 20 and screen 70, there is no need to correct the image projected by projection-type display device 20.

[Determination Processing]

Figure 7:
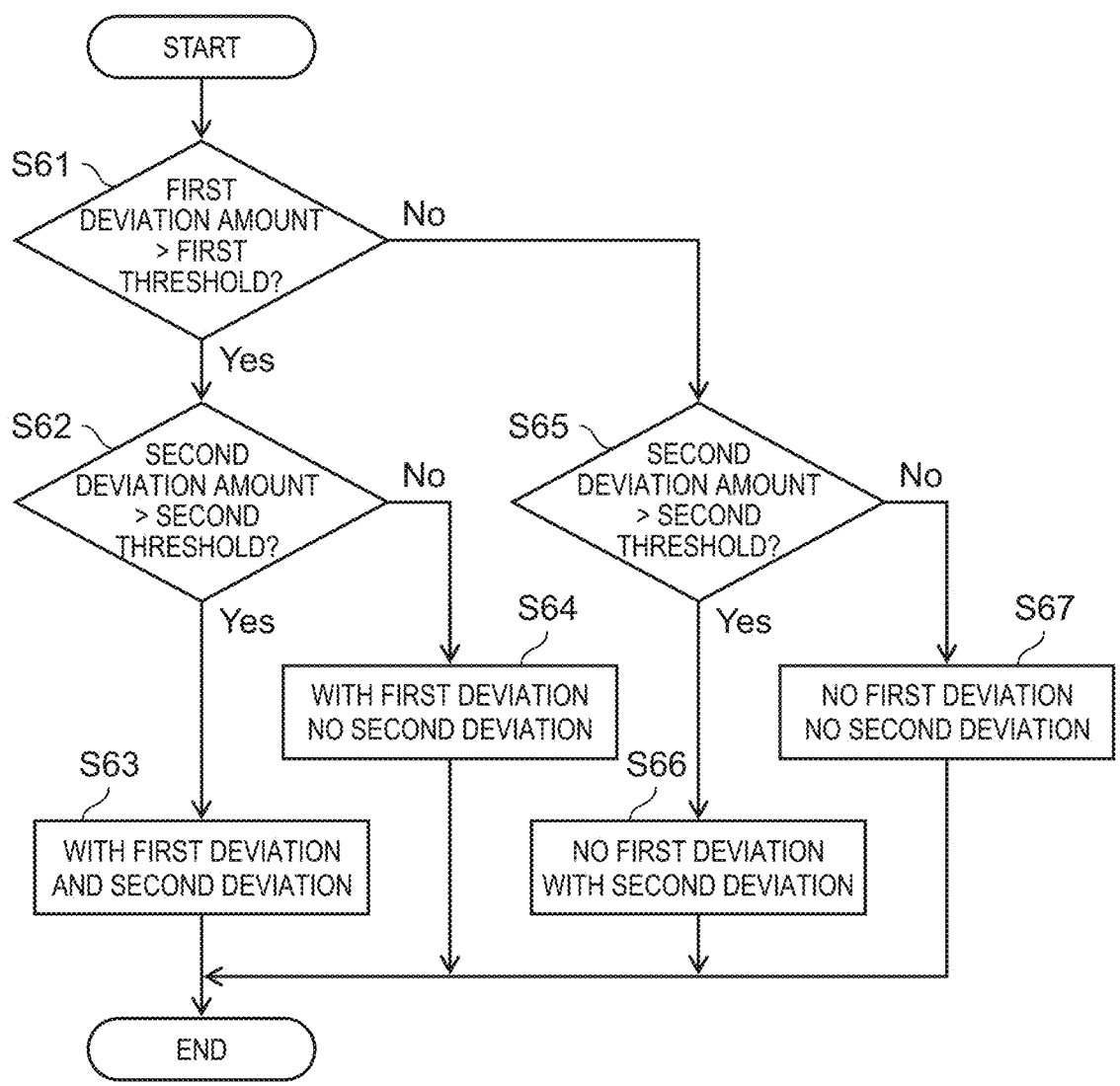
FIG. 7 is a flowchart illustrating an example of determination processing.

Next, determination processing (S14) performed after the comparison processing (S13) will be described in detail. FIG. 7 is a flowchart illustrating an example of determination processing.

Control circuit 44 determines whether or not the first deviation amount calculated in step S51 is larger than a first threshold (S61).

When determining that the first deviation amount is larger than the first threshold (Yes in S61), control circuit 44 determines whether or not the second deviation amount calculated in step S44 is larger than a second threshold (S62).

When determining that the second deviation amount is larger than the second threshold (Yes in S62), control circuit 44 determines that there are both the first deviation and the second deviation (S63).

When determining that the second deviation amount is equal to or less than the second threshold (No in S62), control circuit 44 determines that there is the first deviation and there is no second deviation (S64).

When determining that the first deviation amount is equal to or smaller than the first threshold (No in S61), control circuit 44 determines whether or not the second deviation amount calculated in step S44 is larger than the second threshold (S65).

When determining that the second deviation amount is larger than the second threshold (Yes in S65), control circuit 44 determines that there is no first deviation and there is the second deviation (S66).

When determining that the second deviation amount is equal to or less than the second threshold (No in S65), control circuit 44 determines that there is no first deviation and there is no second deviation (S67).

In step S14, when it is determined that there is at least one of the first deviation and the second deviation, control circuit 44 determines that a deviation has occurred. When it is determined that there is no first deviation and there is no second deviation, control circuit 44 determines that there is no deviation.

In the determination in step S61, each of the coordinate deviation amount of the feature point, the deviation amount of the color information, and the deviation amount of the focus information included in the first deviation amount is compared with the first threshold set for each deviation amount.

[Notification Processing]

Figure 8:
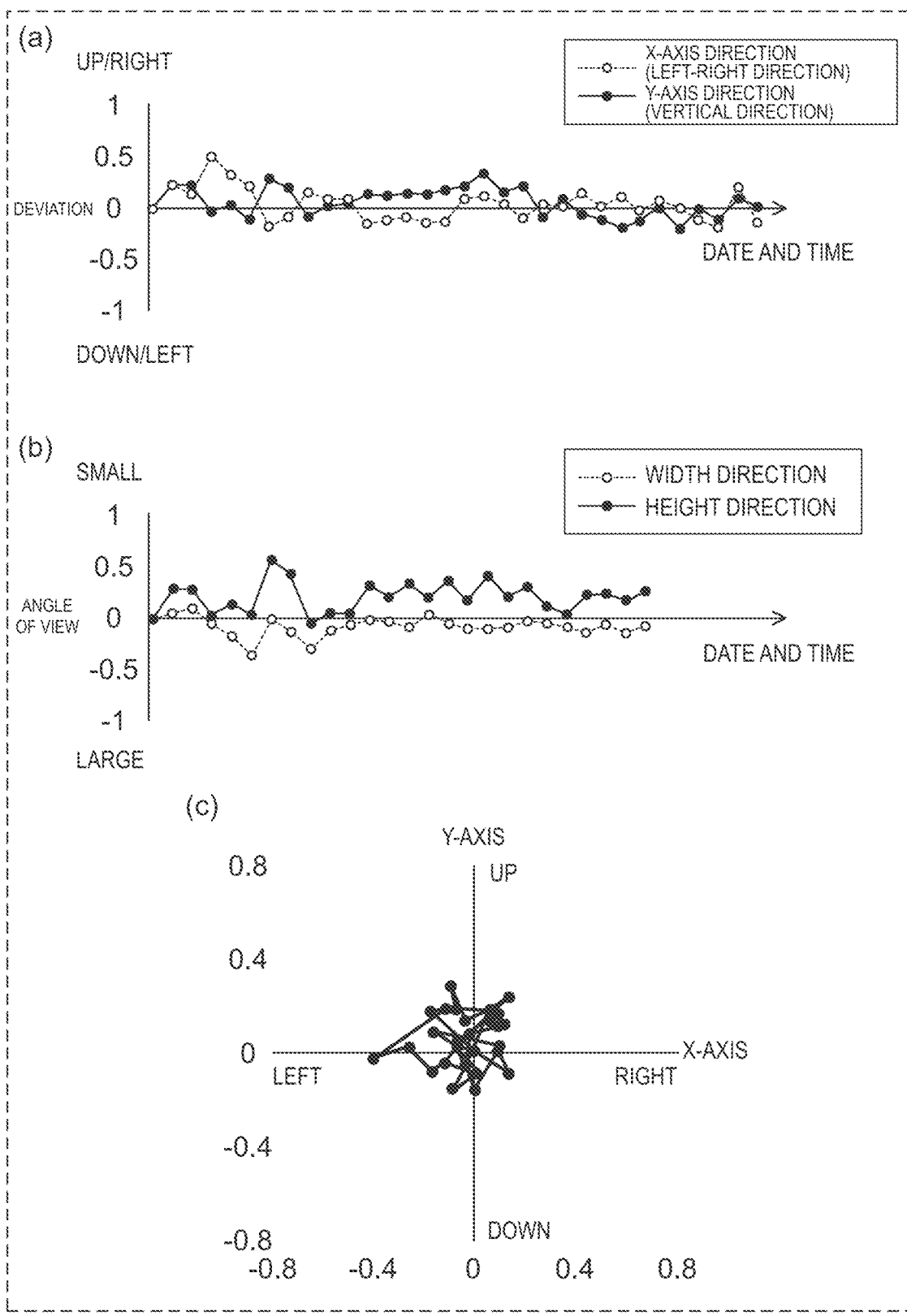
FIG. 8 is a view illustrating an example of a first deviation amount generated in the projection-type display device.
Figure 9:
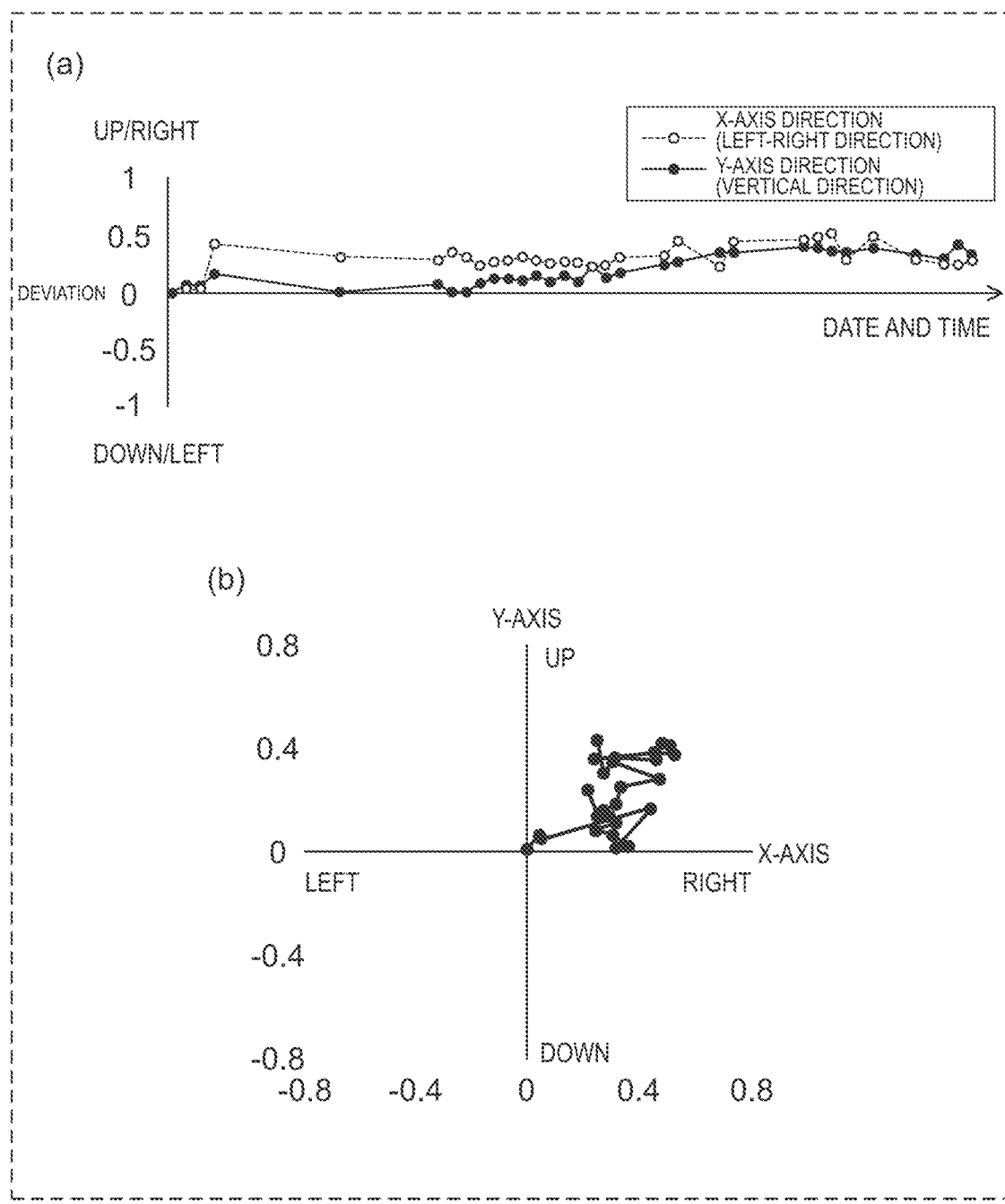
FIG. 9 is a diagram illustrating an example of a second deviation amount generated in the camera.

Next, the deviation information notified in the notification processing will be described with reference to FIGS. 8 and 9. FIG. 8 is a view illustrating an example of a first deviation amount generated in projection-type display device 20. FIG. 9 is a diagram illustrating an example of the second deviation amount generated in camera 30.

Part (a) of FIG. 8 is a graph illustrating a temporal transition of the positional deviation of the projection position of the image projected by projection-type display device 20. In this graph, the vertical axis represents the deviation amount of positional deviation in the X-axis direction (left-right direction or horizontal direction) or the deviation amount of positional deviation in the Y-axis direction. The horizontal axis indicates an elapsed time (date and time). The X-axis direction is a left-right direction (horizontal direction) of an image projected by projection-type display device 20. The Y-axis direction is a vertical direction (vertical direction) of an image projected by projection-type display device 20.

Part (b) of FIG. 8 is a graph illustrating a temporal transition of the positional deviation of the angle of view of the image projected by projection-type display device 20. In this graph, the vertical axis represents the size of the angle of view, and represents the amount of change in the size of the projected image in the width direction (horizontal direction) or the amount of change in the size of the projected image in the height direction (vertical direction). The horizontal axis indicates an elapsed time (date and time).

Part (c) of FIG. 8 is a graph showing a transition of a projection position of an image projected by projection-type display device 20. In this graph, the vertical axis represents the deviation amount in the Y-axis direction, and the horizontal axis represents the deviation amount in the X-axis direction.

Part (a) of FIG. 9 is a graph illustrating a temporal transition of the positional deviation of screen 70 in the image captured by camera 30. In this graph, the vertical axis represents the deviation amount of positional deviation in the X-axis direction (left-right direction or horizontal direction) or the deviation amount of positional deviation in the Y-axis direction. The horizontal axis indicates an elapsed time (date and time). The X-axis direction is a left-right direction (horizontal direction) of an image captured by camera 30. The Y-axis direction is a vertical direction (vertical direction) of the image captured by camera 30.

Part (b) of FIG. 9 is a graph showing a transition of the position of screen 70 in the image captured by camera 30. In this graph, the vertical axis represents the deviation amount in the Y-axis direction, and the horizontal axis represents the deviation amount in the X-axis direction.

As described above, when the first deviation occurs, control circuit 44 may notify the user of deviation information including the graphs (graphs indicating the first deviation) illustrated in part (a) to part (c) of FIG. 8 as the first deviation amount via communication circuit 43. Furthermore, in a case where the second deviation occurs, control circuit 44 may notify the user of deviation information including the graphs (graphs indicating the second deviation) illustrated in part (a) and part (b) of FIG. 9 as the second deviation amount via communication circuit 43. Note that, although not illustrated, the deviation information may include, as the first deviation amount, a graph indicating a temporal transition of the color information in projection-type display device 20, or may include, as the first deviation amount, a graph indicating a temporal transition of the focus information in projection-type display device 20. Further, when the first deviation and the second deviation occur, control circuit 44 may display both the graph indicating the first deviation and the graph indicating the second deviation on monitor 42. Furthermore, in a case where the first deviation occurs and the second deviation does not occur, control circuit 44 displays the graph indicating the first deviation on monitor 42, but does not need to display the graph indicating the second deviation on monitor 42. Further, when the first deviation does not occur and the second deviation occurs, control circuit 44 does not display the graph indicating the first deviation on monitor 42, but may display the graph indicating the second deviation on monitor 42. As a result, it is possible to appropriately notify which one of camera 30 and projection-type display device 20 needs to be maintained.

Note that control circuit 44 may store the deviation information to be notified and the other information in different storages (for example, storage devices 45, 46). For example, control circuit 44 may accumulate the deviation information in storage device 46 in which the access is not limited to the specific user, and accumulate the other information in storage device 45 in which the access is limited to the specific user. The other information includes, for example, a first image, a second image, first analysis data, second analysis data, a comparison result, and the like. In this manner, it is possible to separately store the deviation information to be notified and other various data used for correcting projection-type display device 20 and camera 30. Therefore, for example, it is easy to manage the security levels of both separately. That is, the security level of storage device 45 (an example of the second storage device) may be higher than the security level of storage device 46 (an example of the first storage device) that accumulates the deviation information.

In addition, control circuit 44 may accumulate the deviation information in server 51 (another example of the first storage device) connected via external network 60, and accumulate other information in storage device 45. Since the amount of data of the deviation information is smaller than that of the other information and the deviation information is transmitted to server 51 via network 60, a communication load related to network 60 can be reduced.

Effects and the Like

As described above, the notification method executed by the computer such as projection-type display system 10 (information processing device 40) includes: the first acquisition step (S11) of acquiring the first image including the display area of the video displayed by projection-type display device 20, the first image being captured by camera 30 at the first timing; the second acquisition step (S12) of acquiring the second image including the display area, the second image being captured by camera 30 at the second timing after the predetermined period from the first timing; the comparison step (S13) of comparing the first analysis data based on the first image with the second analysis data based on the second image; the first determination step (S14) of determining, on the basis of the comparison result in the comparison step, whether or not the first deviation has occurred, the first deviation being a deviation of a display parameter related to display by projection-type display device 20, and whether or not the second deviation has occurred, the second deviation being a deviation of a photographing parameter related to photographing by camera 30; and the notification step (S15) of notifying the user of deviation information indicating a deviation determined to have occurred in the determination step among the first deviation and the second deviation.

According to this, since the deviation information notified to the user includes the deviation generated among the first deviation and the second deviation, it is possible to notify the user of the device (that is, projection-type display device 20 or camera 30) having the parameter serving as the source of the included deviation and the deviation. Therefore, it is possible to notify which one of camera 30 and projection-type display device 20 needs to be maintained.

[First Modification]

Figure 10:
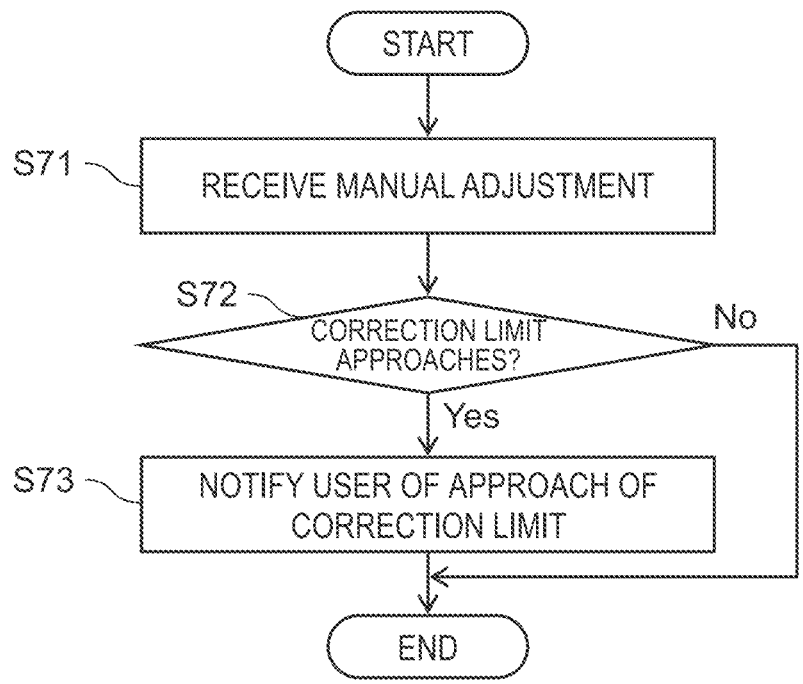
FIG. 10 is a flowchart illustrating an example of notification processing of correction limit according to a first modification.

Next, notification processing of correction limit in the projection-type display system according to a first modification will be described. FIG. 10 is a flowchart illustrating an example of notification processing of correction limit according to the first modification.

Control circuit 44 receives adjustment of the display parameter of projection-type display device 20 on the basis of the input received from the user in input device 41 (S71). For example, in a state in which the test image is projected on projection-type display device 20, control circuit 44 may receive an input from the user, adjust the display parameter, and project the test image according to the adjusted display parameter. Thus, the user can adjust the display parameter to the desired display parameter while visually observing the projected test image. That is, the user can adjust the position, color, luminance, and focus state of the image projected by projection-type display device 20.

Next, control circuit 44 determines whether or not the correction limit is approaching (S72).

Figure 11:
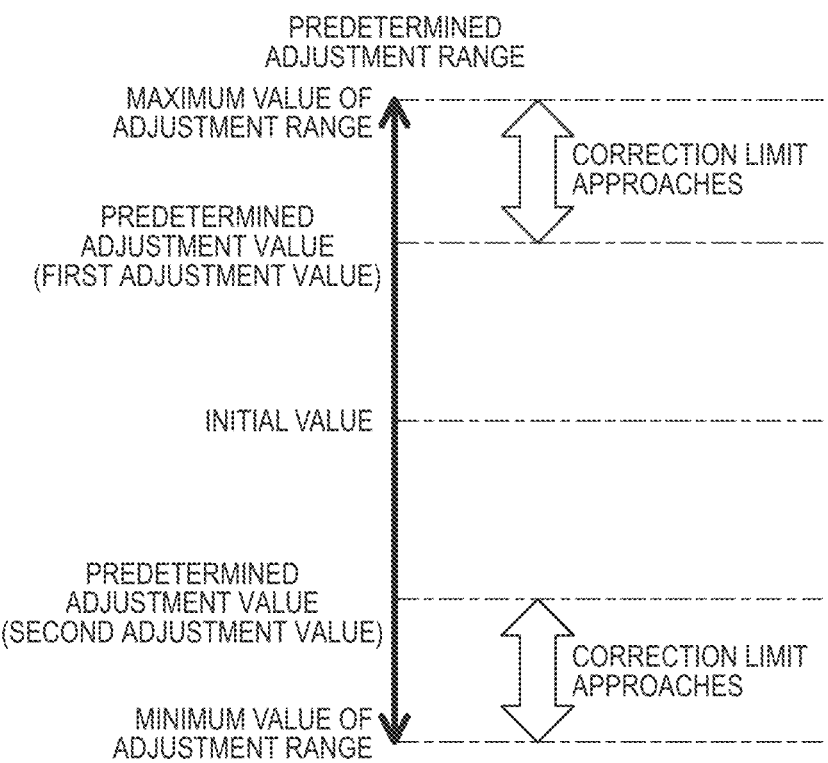
FIG. 11 is a diagram for describing correction limit.

FIG. 11 is a diagram for describing correction limit.

The correction limit is a limit value of adjustment of the display parameter. The display parameter is changed with an adjustment value of a predetermined adjustment range. That is, projection-type display device 20 cannot change the display parameter to the adjustment value outside the predetermined adjustment range. Control circuit 44 determines whether or not the correction limit is approaching by determining whether or not the adjustment value has exceeded a predetermined adjustment value. The predetermined adjustment value is set between the initial value of the adjustment value of each display parameter and the minimum value or the maximum value of the adjustment range. The first adjustment value is set between the initial value of the adjustment value and the maximum value of the adjustment range, and the second adjustment value is set between the initial value of the adjustment value and the minimum value of the adjustment range. The predetermined adjustment value is set to a value closer to the minimum value or the maximum value of the adjustment range than the initial value. Control circuit 44 determines whether or not the adjustment value has approached closer to the minimum value or the maximum value than the predetermined adjustment value from a value closer to the initial value than the predetermined adjustment value, and determines that the correction limit is approaching when it is determined that the adjustment value has approached closer to the minimum value or the maximum value.

Note that this determination may be made for each of the adjustment value of the positional deviation of the display position of projection-type display device 20 (positional deviation of the coordinates of the feature point), the adjustment value of the color of the video projected by projection-type display device 20, and the adjustment value of the focus state of the video projected by projection-type display device 20, or may be made for at least one of these adjustment values. The predetermined adjustment value is a value set to each of these adjustment values.

When determining that the correction limit is approaching (Yes in S72), control circuit 44 notifies the user of the approach of the correction limit (S73). The notification of the correction limit may be included in the deviation information to be notified when the deviation information is notified.

When determining that the correction limit is not approaching (No in S72), control circuit 44 ends the processing.

Note that, in the comparison processing described with reference to FIG. 6, processing of automatically calculating a new correction parameter and setting the new correction parameter is performed. However, even in this case, the processing of steps S72 and S73 may be performed.

As described above, in information processing device 40, the display parameter is changed by the adjustment value of the predetermined adjustment range. Then, information processing device 40 determines whether or not the adjustment value has exceeded a predetermined adjustment value, and notifies the user that the correction limit is approaching in a case where the adjustment value has exceeded the predetermined adjustment value.

Therefore, it is possible to notify the user that the correction limit (limit of adjustment) is approaching. Therefore, it is possible to notify the user that the time at which maintenance is required is approaching.

For example, the display parameter includes a position of the video projected by projection-type display device 20 with respect to the display area. Therefore, it is possible to notify the user that the limit of adjustment of the projection position of the video in projection-type display device 20 is approaching. Therefore, it is possible to notify the user that the necessity of maintenance is approaching.

Further, for example, the display parameter includes a focus state of the video projected by projection-type display device 20. Therefore, it is possible to notify the user that the limit of focus adjustment of the video in projection-type display device 20 is approaching. Therefore, it is possible to notify the user that the time at which maintenance is required is approaching.

Furthermore, for example, the display parameter includes the color of the video displayed by projection-type display device 20. Therefore, it is possible to notify the user that the limit of the color adjustment of the video in projection-type display device 20 is approaching. Therefore, it is possible to notify the user that the time at which maintenance is required is approaching.

Furthermore, for example, the display parameter includes the luminance of the video displayed by projection-type display device 20. Therefore, it is possible to notify the user that the limit of the luminance adjustment of the video in projection-type display device 20 is approaching. Therefore, it is possible to notify the user that the time at which maintenance is required is approaching.

[Second Modification]

Figure 12:
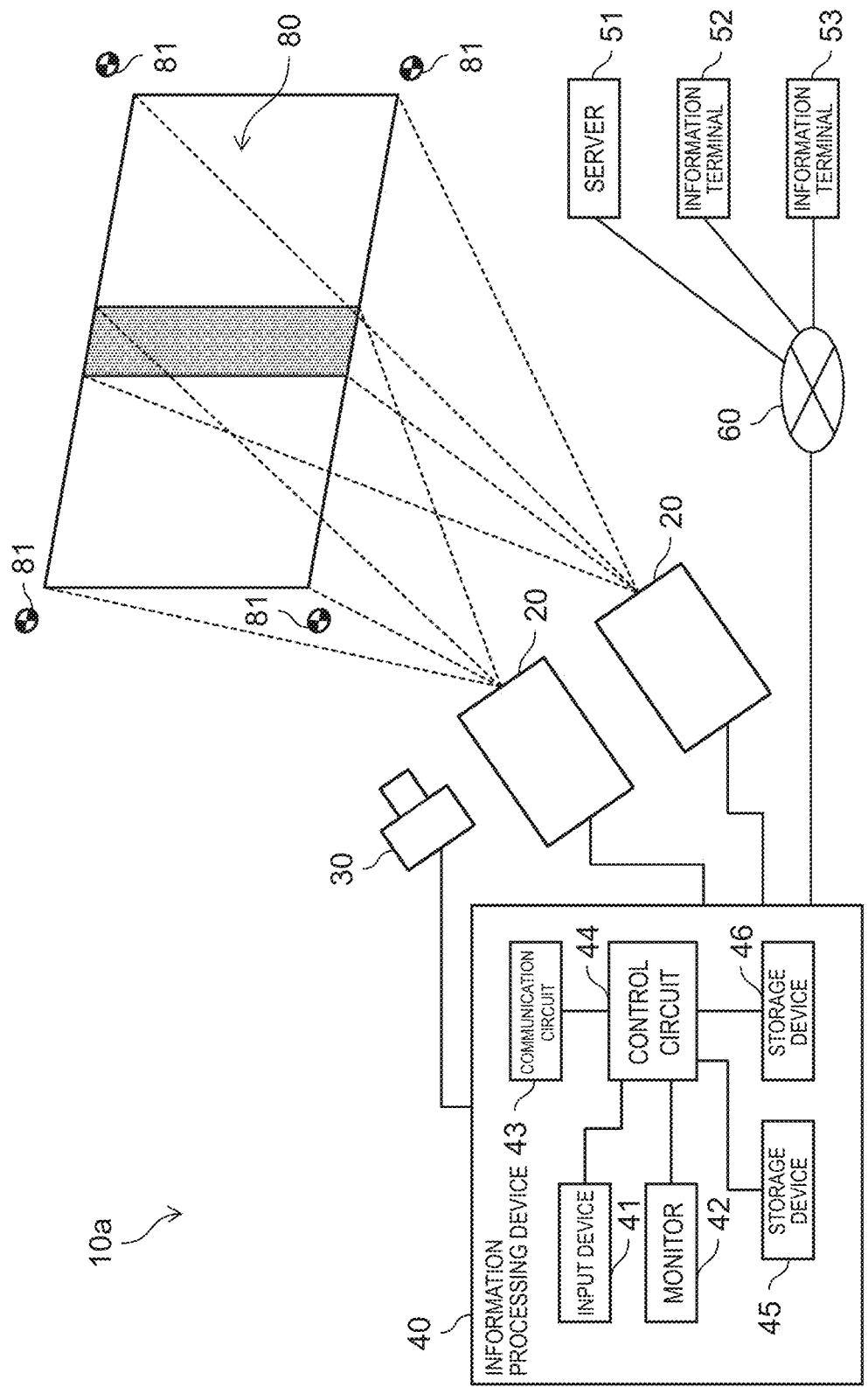
FIG. 12 is a view illustrating a configuration of a projection-type display system according to a second modification.

Next, a configuration of a projection-type display system according to a second modification will be described. FIG. 12 is a diagram illustrating a configuration of the projection-type display system according to the second modification.

Projection-type display system 10a is different from projection-type display system 10 in that an image is projected onto wall surface 80 instead of screen 70, and the other configurations are the same as those of projection-type display system 10, so that the description thereof is omitted.

Wall surface 80 is used as an area onto which an image is projected by projection-type display device 20. Four non-luminescent markers 81 are provided on wall surface 80. The number and arrangement of non-luminescent markers 81 are not particularly limited.

In the feature point detection processing executed by projection-type display system 10a, feature points appearing in a plurality of non-luminescent markers 81 (or the periphery thereof) shown in the first image are detected, and control circuit 44 uses an algorithm suitable for detecting such feature points. The processing of detecting a feature point in the second image is also similar to the feature point detection processing (the processing of detecting a feature point in the first image).

[Third Modification]

Figure 13:
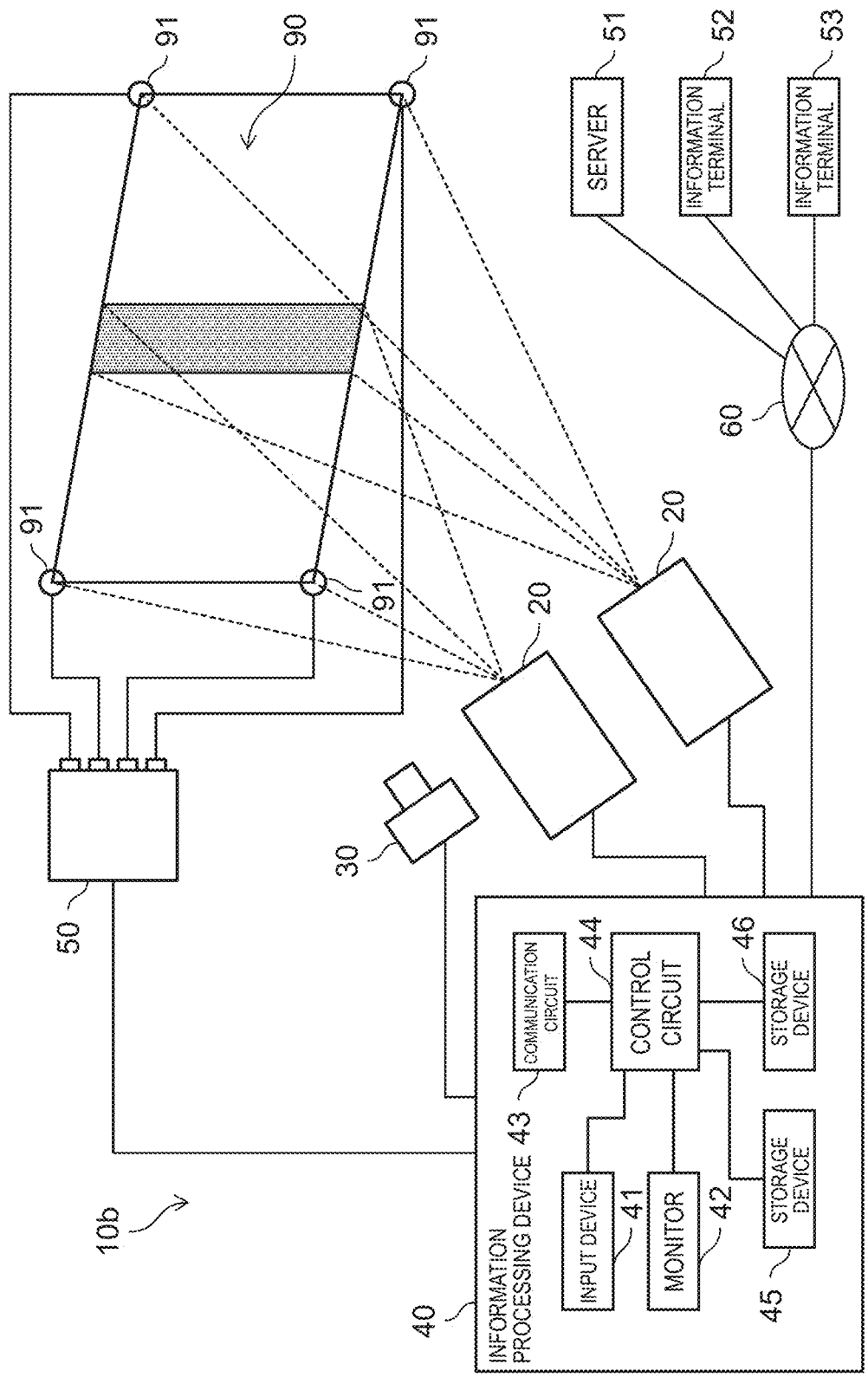
FIG. 13 is a view illustrating a configuration of a projection-type display system according to a third modification.

Next, a configuration of a projection-type display system according to a third modification will be described. FIG. 13 is a diagram illustrating a configuration of a projection-type display system according to the third modification.

Projection-type display system 10b projects an image onto screen 90. Unlike screen 70, screen 90 is not provided with frame 70a, and instead of frame 70a, luminescent markers 91 are provided at respective positions corresponding to four vertexes (corners) of screen 90.

Unlike projection-type display system 10, projection-type display system 10b includes marker controller 50. Other configurations of projection-type display system 10b are similar to those of projection-type display system 10, and thus description thereof is omitted.

Marker controller 50 turns on and off luminescent marker 91 under the control of information processing device 40. Luminescent marker 91 is realized by, for example, a light emitting diode (LED) element. The number and arrangement of luminescent markers 91 are not particularly limited.

In the feature point detection processing executed by projection-type display system 10b, the first image is captured in a state where a plurality of luminescent markers 91 are turned on by marker controller 50, and a feature point appearing in the plurality of luminescent markers 91 (or the periphery thereof) shown in the first image is detected. Control circuit 44 uses an algorithm suitable for detecting such a feature point.

Other Exemplary Embodiments

Although the notification method and the projection-type display system according to the exemplary embodiment have been described above, the present disclosure is not limited to the above exemplary embodiment.

For example, the frame of the screen, the marker, or the like is used in the detection of the feature point in the above exemplary embodiment, but other objects may be used for the detection of the feature point. The object is not particularly limited as long as the relative position between the camera and the surface onto which the image is projected can be specified.

For example, in the above exemplary embodiment, the projection-type display system is realized by a plurality of devices. Alternatively, the projection-type display system may be realized as a single device. For example, the projection-type display system may be realized as a single device corresponding to an information processing device. When the projection-type display system is realized by a plurality of devices, each component included in the projection-type display system may be distributed to the plurality of devices in any manner.

For example, in the above exemplary embodiment, projection-type display device 20 has been described as an example of the display device, but the present disclosure is not limited thereto. For example, a non-projection-type display device such as a liquid crystal display or an organic EL display may be used. Even in this case, notification regarding display parameters other than the projection position of the video can be performed.

For example, in the above exemplary embodiment, the deviation to be notified has been described as the deviation from the initial state. However, with regard to the deviation in focus, color, and luminance, each optimal state changes according to a change in the surrounding environment or the like. Therefore, deviation information from the optimal display state at that time may be notified to the user. Here, as a method of adjusting the color and the luminance to the optimum display state at that time, a method of adjusting the display state of another display device to the darkest display device at that time, or a method of adjusting the color and the luminance to the optimum display state determined in advance by the system or the user may be used.

In addition, in the above exemplary embodiment, processing executed by a specific processing unit may be executed by another processing unit. Furthermore, the order of a plurality of processing may be changed, or a plurality of processing may be executed in parallel.

In the above exemplary embodiments, each component may be implemented by executing a software program suitable for each component. Each component may be implemented by a program execution unit such as a CPU or a processor reading and executing a software program recorded in a recording medium such as a hard disk or a semiconductor memory.

In addition, each component may be implemented by hardware. For example, each component may be a circuit (or an integrated circuit). These circuits may constitute one circuit as a whole or may be separate circuits. Each of these circuits may be a general-purpose circuit or a dedicated circuit.

In addition, general or specific aspects of the present disclosure may be implemented by a system, an apparatus, a method, an integrated circuit, a computer program, or a computer-readable recording medium such as a CD-ROM. In addition, the present invention may be implemented by an arbitrary combination of a system, an apparatus, a method, an integrated circuit, a computer program, and a recording medium. For example, the present disclosure may be implemented as the projection-type display system or information processing device 40 of the above exemplary embodiments. The present disclosure may be implemented as a program (computer program product) for causing a computer to execute the calibration method of the above exemplary embodiments, or may be implemented as a non-transitory computer-readable recording medium storing such a program.

In addition, the present disclosure also includes a mode obtained by applying various modifications conceived by those skilled in the art to each exemplary embodiment, or a mode realized by arbitrarily combining components and functions in each exemplary embodiment within a range not departing from the gist of the present disclosure.

INDUSTRIAL APPLICABILITY

The notification method of the present disclosure is useful as a notification system or the like that can notify which one of the camera and the display device needs to be maintained.

REFERENCE MARKS IN THE DRAWINGS 10, 10a, 10b: projection-type display system
20: projection-type display device
30: camera
40: information processing device
41: input device
42: monitor
43: communication circuit 44: control circuit
45, 46: storage device
50: marker controller
51: server
52, 53: information terminal
60: network
70, 90: screen
70a: frame
70b: overlapping portion
80: wall surface
81: non-luminescent marker
91: luminescent marker

The invention claimed is:

1. A notification method, comprising:
a first acquisition step of acquiring a first image captured by a camera at a first timing, the first image including a display area of a video displayed by a display device;
a second acquisition step of acquiring a second image captured by the camera at a second timing after a predetermined period from the first timing, the second image including the display area;
a comparison step of comparing first analysis data based on the first image with second analysis data based on the second image;
a first determination step of determining, on a basis of a comparison result in the comparison step, whether or not a first deviation has occurred, the first deviation being a deviation of a display parameter related to display by the display device, and whether or not a second deviation has occurred, the second deviation being a deviation of a photographing parameter related to photographing by the camera; and
a notification step of notifying a user of deviation information indicating a deviation determined to have occurred in the first determination step among the first deviation and the second deviation.

2. The notification method according to claim 1, further comprising a change step of receiving adjustment of the display parameter and changing the display parameter according to the received adjustment.

3. The notification method according to claim 2, wherein the display parameter is changed with an adjustment value of a predetermined adjustment range,
the notification method further includes a second determination step of determining whether or not the adjustment value has exceeded a predetermined adjustment value, and
in the notification step, when the adjustment value has exceeded the predetermined adjustment value in the second determination step, the user is further notified that an adjustment limit is approaching.

4. The notification method according to claim 1, further comprising an evaluation step of evaluating a deviation of the display parameter on a basis of the first image and the second image,
wherein in the first determination step, it is determined whether or not a first deviation has occurred, the first deviation being a deviation of the evaluated display parameter.

5. The notification method according to claim 1, wherein the display device is a projector that projects a video onto the display area, and
the display parameter includes a position of a video projected by the projector with respect to the display area.

6. The notification method according to claim 1, wherein the display device is a projector that projects an image onto the display area, and
the display parameter includes a focus state of a video projected by the projector.

7. The notification method according to claim 1, wherein the display parameter includes a color of a video displayed by the display device.

8. The notification method according to claim 1, wherein the display parameter includes luminance of a video displayed by the display device.

9. The notification method according to claim 1, wherein
the notification method is executed by a controller connected to the camera and the display device via a local network, and
the notification method further includes
a first accumulation step of accumulating the deviation information notified in the notification step in a first storage device, and
a second accumulation step of accumulating at least one of the first image, the second image, the first analysis data, the second analysis data, and the comparison result in a second storage device different from the first storage device.

10. The notification method according to claim 9, wherein
the controller includes the first storage device and the second storage device, and
the second storage device has a security level higher than a security level of the first storage device.

11. The notification method according to claim 9, wherein
the first storage device is connected to the camera and the display device via an external network, and
the second storage device is connected to the camera and the display device via the local network.

12. The notification method according to claim 1, further comprising a display step of displaying a graph indicating the first deviation and a graph indicating the second deviation when it is determined that the first deviation has occurred and it is determined that the second deviation has occurred.

13. The notification method according to claim 1, further comprising a display step of displaying a graph indicating the first deviation when it is determined that the first deviation has occurred and it is determined that the second deviation has not occurred.

14. The notification method according to claim 1, further comprising a display step of displaying a graph indicating the second deviation when it is determined that the first deviation has not occurred and it is determined that the second deviation has occurred.

15. A non-transitory computer-readable storage medium storing a program for causing a computer to execute the notification method according to claim 1.

16. A notification system, comprising:
a display device;
a camera; and
an information processing device,
wherein the information processing device executes a notification method including
a first acquisition step of acquiring a first image captured by a camera at a first timing, the first image including a display area of a video displayed by a display device,
a second acquisition step of acquiring a second image captured by the camera at a second timing after a predetermined period from the first timing, the second image including the display area, a comparison step of comparing first analysis data based on the first image with second analysis data based on the second image, a first determination step of determining, on a basis of a comparison result in the comparison step, whether or not a first deviation has occurred, the first deviation being a deviation of a display parameter related to display by the display device, and whether or not a second deviation has occurred, the second deviation being a deviation of a photographing parameter related to photographing by the camera, and a notification step of notifying a user of deviation information indicating a deviation determined to have occurred in the first determination step among the first deviation and the second deviation.

* * * * *